Nov. 7, 1961 C. F. ANDERSON ET AL 3,008,122

SELECTIVE STATION COMMUNICATION SYSTEM

Filed Jan. 28, 1957 4 Sheets-Sheet 1

INVENTORS:
Carl F. Anderson,
George S. Corbeil

By Smyth & Roston
Attorneys

Nov. 7, 1961 C. F. ANDERSON ET AL 3,008,122

SELECTIVE STATION COMMUNICATION SYSTEM

Filed Jan. 28, 1957 4 Sheets-Sheet 2

INVENTORS:
Carl F. Anderson
George S. Corbeil

By Smyth & Roston
Attorneys

SELECTIVE STATION COMMUNICATION SYSTEM

Filed Jan. 28, 1957 4 Sheets-Sheet 3

INVENTORS:
Carl F. Anderson
George S. Corbeil
By Smyth & Roston
Attorneys

SELECTIVE STATION COMMUNICATION SYSTEM

Filed Jan. 28, 1957

INVENTORS:
Carl F. Anderson
George S. Corbeil
By Smyth & Roston
Attorneys 3,008,122

SELECTIVE STATION COMMUNICATION SYSTEM

Carl F. Anderson, Los Angeles, and George S. Corbeil, Rolling Hills, Calif., assignors to Telautograph Corporation, Los Angeles, Calif., a corporation of Virginia Filed Jan. 28, 1957, Ser. No. 636,653
12 Claims. (Cl. 340—147)

The present invention relates to telescribing systems and apparatus by which handwritten messages may be transmitted from a central station to one or more remote points.

Telescribing systems, in general, have long been well known to the communications art. The systems have proven to be extremely useful in situations in which it is desired that written instructions and orders be disseminated, for example, over the signature of a supervising officer. Telescribing systems are particularly useful for this purpose because they make it possible positively to fix responsibility and authority, and they enable instructions to be made in written, rather than verbal form, so as to preclude later argument.

Telescribing systems are also useful in institutions, such as banks, and in other organizations in which it is desired that a specimen of a client's handwriting or signature be immediately reproduced in various departments of the institution.

The systems are also extremely useful in distributing weather data and the like. The systems are especially suited for this application since they have the unique property of permitting printed forms to be used at the central station and at the remote stations and of enabling the operator at the central station effectively to fill in the blanks on the forms at the remote stations. Apart from the dissemination of weather data, the systems find general utility wherever a form may be used, and in which various blanks of the form are to be filled in from time to time.

Present day telescribing systems make it possible instantaneously to reproduce the handwritten messages at various parts of a particular building when so desired, or in widely separated parts of the country. In fact, recent telescribing systems are designed to make use of the existing telephone lines so that telescribing information can be transmitted to any point in the world serviced by telephone.

In the usual telescribing system, each station in a particular network usually includes a transmitter for messages originated at that station and a receiver for receiving messages from other stations. The receiver is also used for monitoring messages transmitted from the local transmitter.

Each transmitter has a manually operable stylus that is mechanically linked to certain electrical control elements. As the stylus is moved by the operator in a transcribing motion over an associated platen, the control elements are caused to vary the electrical characteristics of a pair of electrical signals as a function of such motion. These varying electrical signals are transmitted to the receivers at the remote stations.

Each receiver has a pen or equivalent recording element. The pen is linked to electrical control elements which are under the control of the electrical signals received either from the local transmitter or from a distant transmitter. In this manner, the receiver pen is constrained to track and follow the inscribing motions of the transmitter stylus.

The receiver pen is moved by its control elements over a recording paper. Therefore, as the stylus at a particular transmitter is moved over its platen to inscribe a message, the pens at the various receivers are moved in unison over their recording media to instantaneously record the message at the various distant points. As noted, the receiver at each transmitter is used to monitor its own transmitter and also to record messages from a remote station. Of course, receivers without associated transmitters may be used in many points or remote stations at which no messages are to originate.

Many refinements have been incorporated into present day telescribing systems. For example, one or more additional control signals usually are also transmitted to the remote stations along with the electrical signals referred to above. One of these additional control signals may be used, for example, to control the receiver pens and to lift such pens from their recording media whenever the transmitter stylus is raised from its associated platen. This permits discontinuous traces to be made at the receivers in correspondence with any discontinuities, as between words and the like, in the inscriptions of the stylus at the transmitting transmitter.

In addition, appropriate controls have been included in many present day telescribing systems to permit the recording paper or equivalent recording medium at the receivers to be shifted under the control of the operator at the transmitting station. This permits a plurality of messages to be sent to the various distant stations without the need for an operator to be in continuous attendance at those stations.

As noted above, most telescribing systems use a pair of signals for transmitting information relative to the inscribing motion of the transmitter stylus. One of these signals, for example, may be varied linearly as the transmitter stylus is moved along the right diagonal of its platen, and the other signal may be varied linearly as the stylus is moved along the left diagonal. Thus, the two signals, when taken together, exhibit a particular characteristic for each position of the stylus on its platen. These signals, therefore, are appropriate to control the receiver pens and cause the pens to track the transmitter stylus. One of these two signals is usually referred to as the "right line signal," and the other is usually referred to as the "left line signal."

Copending application Serial No. 552,542, filed December 12, 1955, by Carl F. Anderson et al., now Patent No. 2,904,631, granted Sept. 15, 1959 and copending application Ser. No. 615,834, filed October 15, 1956, by Carl F. Anderson et al., now Patent No. 2,916,550 granted December 8, 1959, describe and claim telescribing systems in which the motion of a stylus at the transmitting station produces frequency shifts for each of the two frequency displaced signals. This application of frequency shift principles to telescribing transmissions overcomes many of the problems that originally arose as a result of the effects of signal attenuation and noise disturbances on faithful reproduction at the various receiving stations. Also, this application of frequency shift principles enables existing telephone lines and equipment to be used for transmitting the information to the various receiving stations, as is fully described in the copending applications referred to above.

In the systems disclosed in the copending applications, the manually operated stylus at the transmitter is made to shift the frequencies of a pair of oscillators as it is moved over the surface of its associated platen. The first or "left line" oscillator has a certain particular center frequency of, for example, 2300 cycles, and the stylus varies this frequency in a linear manner in a range of plus or minus 30 cycles in accordance with the movements of the stylus along the left diagonal of the platen. The second or "right line" oscillator has a different particular center frequency of, for example, 1700 cycles, and the stylus varies this latter frequency linearly in the range of plus or minus 30 cycles in accordance with the movements of the stylus along the right diagonal of the platen.

Therefore, any position of the stylus at the transmitting station on the platen is represented by a particular positive or negative shift in the frequency of each of the oscillator output signals with respect to their respective center frequencies. To control the position of the pens at the receiving stations, the "right line" and "left line" signals are transmitted to the receivers, and the receiver pens are moved in a manner to be described in accordance with the frequency shifts of these signals.

To achieve the desired control of the receiver pens, each receiving station includes a pair of frequency discriminators, one for each of the two frequency-shifted oscillator signals received from the transmitter. These frequency discriminators are controlled to provide respective output voltages which vary as the frequencies of the two oscillator signals are shifted in response to movements of the stylus at the transmitting station. These discriminator output voltages are utilized to control the position of the receiver pen. It is clear that the discriminators at each of the receiving stations must have extremely linear response characteristics. Only with such linearity can the pens at the receiving stations be expected faithfully to duplicate the written messages at the transmitting station.

The systems disclosed in the copending applications make efficient use of existing telephone lines for the transmission of the inscribing information to the remote stations by the two frequency-shifted signals described above. A third signal is also transmitted over the telephone lines and is provided at different times with either one or the other of two frequencies. When the third signal has the first frequency, means are operated for retaining the stylus at the receiving station on the platen to prevent the recording of messages when the third signal has the second frequency.

The system of the present invention will be described as predicated upon frequency shift principles as are the systems of the copending applications. However, it will be evident as the description proceeds that the present invention is not limited to frequency shift systems.

An important feature of the present invention is the provision of an improved telescribing system which incorporates selective calling such that each transmitter may communicate with one or more selected receivers instead of a blanket coverage of all the receivers in the network. In one embodiment of the invention, a dialing mechanism and associated circuitry are incorporated into each transmitter unit. This dialing mechanism enables, in a manner to be described, a selected receiver or group of receivers to be singled out for any particular message.

Suitable control means are provided in the system of the invention for responding to a calling signal from any transmitter for selecting any receiver. Whenever this calling signal appears on the common transmission medium, a locking means prevents any other transmitter from being placed in an operative condition and thereby interfere with the transmission from the original transmitter. That is, when any particular transmitter has the common line no other transmitter can be placed in an operative condition even though the particular transmitter is communicating with but one receiver in the network.

Other control means are provided to prevent a calling transmitter from having any effect until the calling or dialing operation from the calling transmitter has become effective in selecting a particular one of the receiving stations. This is to prevent the occurrence of abrupt motions of the recording pens at the various receivers from their positions of rest, especially when such receivers are not to record any message. Such abrupt motions can result in ink spillage and also possible damage to the linkage mechanism coupling these pens to the receiver controls.

Still other means are provided in the system for preventing the common transmission medium from being inadvertently tied up by one transmitter without the concomitant transmission of a message. Such means operate to automatically cut any transmitter off the line if a message is not actually initiated within a particular time after the completion of a dialing operation. This is to prevent an operator from inadvertently or otherwise dialing a distant station and then leaving the equipment without the transmission of a message.

In addition, at the end of each message, the transmitting transmitter is automatically held on the line after the termination switch has been actuated. This holdover is made long enough so that the communicated receiver may be signaled to the effect that a message has been sent it. The holdover is also made sufficiently long so that appropriate control signals can be sent to that receiver to shift its recording paper and enable another message to be sent to it without any necessity of recalling the particular receiver. In the absence of such signaling or paper-shifting control signals, the transmitting transmitter is automatically taken off the line when a particular interval has elapsed after the terminating switch for the station has been actuated.

In the drawings:

FIGURE 1 is a block diagram of apparatus at a transmitting station for converting the movements of a stylus into shifts in frequency of a pair of transmitted signals and of apparatus at a receiving station for converting the frequency-shifted signals into corresponding movements of a stylus at the receiving station, the illustrated diagram including units for realizing the selective calling features and other appropriate control of the present invention;

Figure 6:
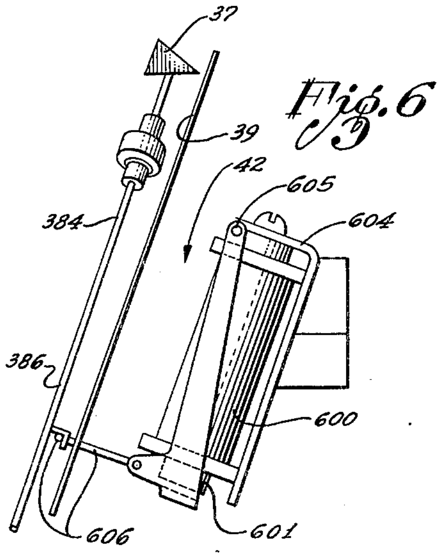
Figure 5:
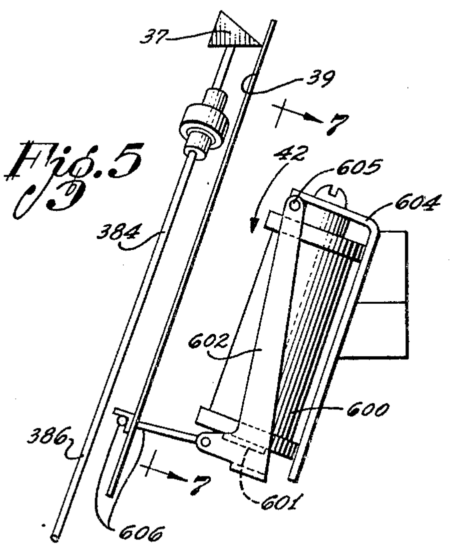
Figure 7:
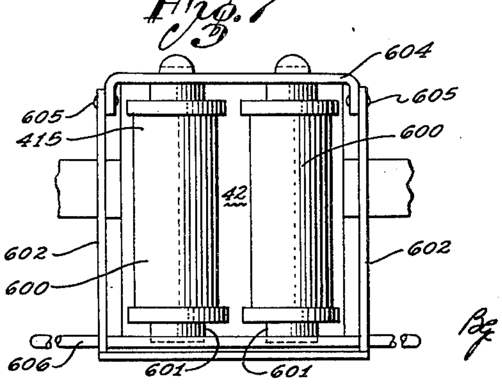

FIGURE 5 is a view, partly in section, somewhat schematically illustrating a solenoid and associated apparatus in the de-energized state of the solenoid and also illustrating apparatus for controlling the pen at the receiving station so that the pen will contact its writing surface and inscribe a message only when the stylus at the transmitting station is actually held against its associated platen;

FIGURE 6 is a view similar to that of FIGURE 5 and shows the relative disposition of the members of FIGURE 5 when the solenoid is energized; and FIGURE 7 is a sectional view substantially on the line 7—7 of FIGURE 5 and illustrates in further detail the construction of the solenoid of FIGURES 5 and 6.

Figure 1:
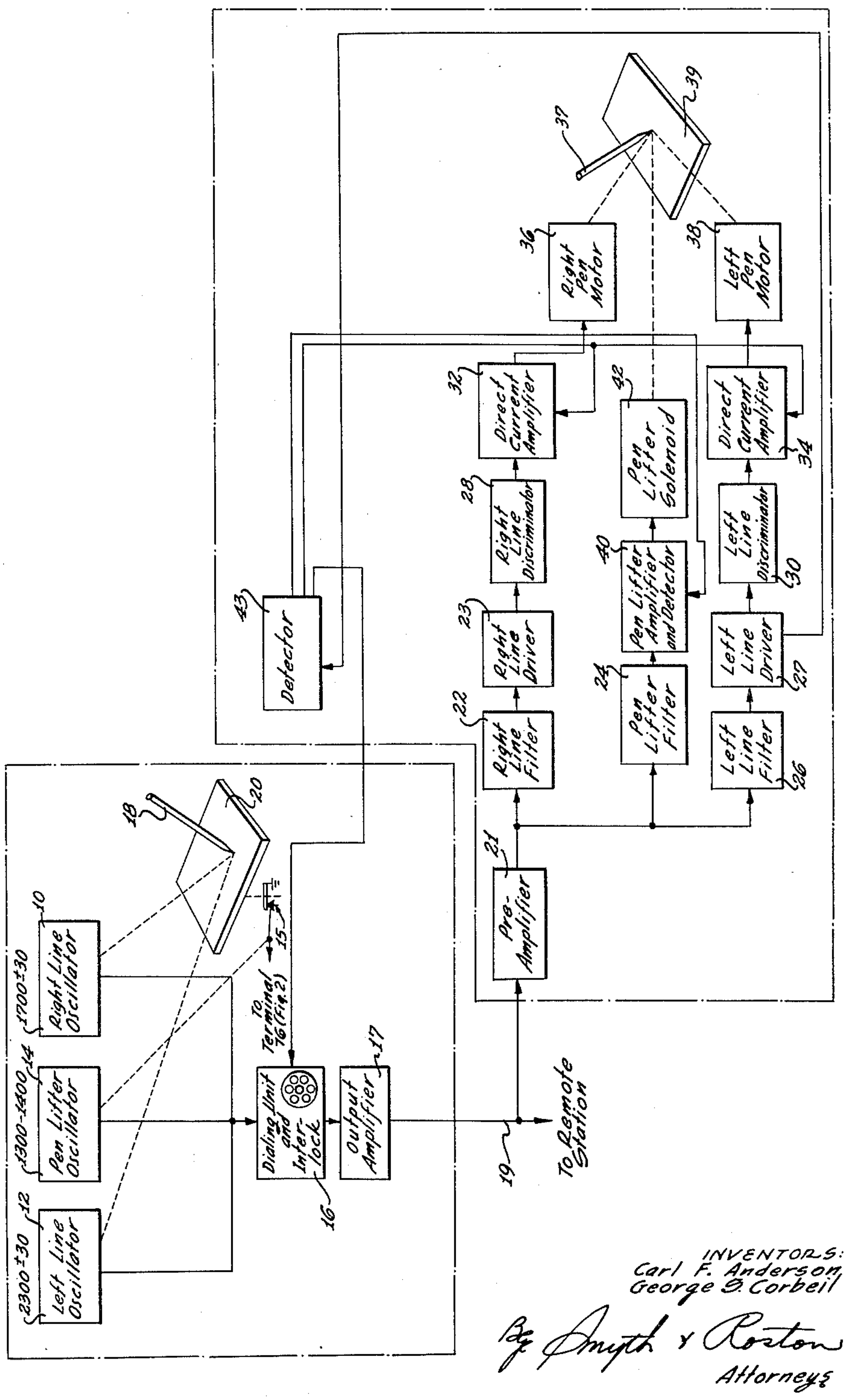

The block diagram of FIGURE 1 shows three oscillators 10, 12 and 14 which are included in the transmitting apparatus of the station. The output terminals of these oscillators are coupled to a dialing unit and interlock 16 which, in turn, is connected to an output amplifier 17. The amplifier 17 is coupled to a suitable transmission medium such as an existing telephone line 19. The line 19 serves as the common transmission medium connecting the transmitter with other stations in the network.

The frequency of the oscillator 12, which shall be termed the "left line" oscillator, is controlled and shifted by a manually operable stylus 18. The stylus is coupled to the oscillator in a manner such that, as it is moved along the left diagonal of a platen 20, it shifts the left line oscillator frequency linearly from a minimum to a maximum. For example, the left line oscillator 12 may have a center frequency of 2300 cycles. This frequency may be shifted through a range of plus or minus 30 cycles in a linear manner in accordance with the movements of the stylus 18 from the center of the platen 20 along the left diagonal of the platen.

The oscillator 10, which shall be termed the "right line" oscillator, may have a predetermined center frequency of 1700 cycles. The frequency of this latter oscillator is controlled and shifted by the movements of the stylus 18 along the right diagonal of the associated platen 20. For example, the stylus is coupled to the latter oscillator in such a manner that, as it is moved from the center of the platen forwardly along the right diagonal, it increases the frequency of the oscillator 10 from 1700 toward 1730 cycles. Alternately, when the stylus 18 is moved from the center of the platen rearwardly along the right diagonal, it decreases the frequency of the oscillator 10 from 1700 toward 1670 cycles.

In the manner described in the preceding paragraphs, any position to which the stylus 18 is set at any particular instant on the platen 20 is accompanied by a corresponding frequency shift in the left line oscillator 12 and by another corresponding frequency shift in the right line oscillator 10.

Whenever the stylus 18 is lifted from the platen 20, the pen at each receiving station should also be lifted so that it will not inscribe extraneous lines over its wiring surface. This lifting control of the receiver pens is achieved by means of the oscillator 14, which shall be termed the "pen lifter" oscillator. Whenever the stylus 18 is pressed down on the platen 20 to inscribe a message, it opens a spring-loaded switch 15 that is positioned under the platen. The opening of the switch 15 causes the frequency of the oscillator 14 to be established at a selected value. On the other hand, when the stylus is lifted from the platen, the switch closes and the oscillator 14 is established at a second frequency.

Each receiving station includes a filter circuit, which is constructed to pass only the signal from the oscillator 14 when the oscillator is operating at its second frequency to indicate that the transmitter stylus has been raised. The signal passed by this filter is then used to energize a solenoid, which lifts the pen at the receiving station from its inscribing surface. In this manner, whenever the stylus 18 is lifted from the platen 20, the pen at each receiving station is also lifted from its inscribing surface. The pen lifter oscillator 14 may be constructed, for example, to have a frequency of 1400 cycles when the stylus 18 is pressed against the platen 20 to open the switch. The oscillator 14 may have a frequency of 1300 cycles whenever the stylus 18 is raised from the platen 20 so as to obtain a closure of the switch 15. The receiving stations are constructed to select only the 1300-cycle signal.

The transmission line 19 is connected to a preamplifier 21 in the receiver portion of the local station or in the receiver portions of the stations remote from the local station. As noted previously, the receiver portion of each station serves to monitor the messages from its local transmitter and also to utilize signals received from distant transmitters over the transmission line 19.

The preamplifier 21 is connected to three filters 22, 24 and 26. The filter 22 is designed to select the right line frequency-shifted signal from the right line oscillator 10. This filter, for example, may be designed to pass a band of signal frequencies of the order of 1700 cycles plus or minus 40 cycles. The filter 22 is connected to a driver amplifier stage 23, which is designated as the "right line driver." The right line driver is connected to a frequency discriminator 28, which shall be termed the "right line" discriminator. The output terminal of the discriminator 28 is connected to a direct current amplifier 32. The amplifier 32 includes the control winding of a motor 36 in its output circuit. The motor 36 shall be termed the "right pen" motor, and it is linked to a recording pen 37 at the receiving station in a manner to be described to move it over its recording medium 39.

The filter 26 is designed to pass signal frequencies of the order of 2300 cycles plus or minus 60 cycles and the filter is designed to select the left line frequency-shifted signal from the left line oscillator 12. The output terminal of the filter 26 is connected to a driver stage 27 which shall be termed the "left line" driver. The driver stage 27 is connected to a frequency discriminator 30 which shall be termed the "left line" discriminator. The output terminal of the discriminator 30 is connected to a direct current amplifier 34, and this amplifier has the control winding of a control motor 38 in its output circuit. The motor 38 shall be termed the "left pen" motor and it also is linked to the pen 37 at the receiver in a manner to be described.

Unlike the filters 22 and 26, the filter 24 is designed to have extremely sharp characteristics and is intended to pass the signal from the pen lifter oscillator 14 only when it is at its second frequency and when the stylus 18 is away from the platen 20. For example, the filter 24 may be designed to pass the signal from the oscillator 14 when its frequency is 1300 cycles, but to attenuate completely this signal when its frequency is shifted to 1400 cycles.

The filter 24 is connected to an amplifier and detector unit 40 which shall be termed the "pen lifter" detector. This detector transforms the alternating current signal from the oscillator 14 and passed by the filter 24 into a direct voltage. The detector 40 is connected to a pen lifter solenoid 42 and energizes the solenoid whenever the stylus 18 is lifted from the platen 20. The pen lifter solenoid is mechanically coupled to the receiver pen 37 in a manner to be described. The solenoid operates to lift the pen from the inscribing medium 39 whenever the stylus 18 at the transmitter is lifted up from its platen 20 so as to close the switch 15.

The left line drive 27 is coupled to a detector 43 which will be described in detail and which includes a clamper (also to be described). The clamper portion of the detector 43 is constructed normally to place a negative bias on the amplifiers 32 and 34 to drive these amplifiers to a state of non-conductivity and to render the amplifier unresponsive to signals introduced to their input circuits. The detector also normally supplies a control signal to the pen lifter solenoid 42 to hold the recording pen 37 up from its recording medium 39. Also, the detector 43 controls the dialing and interlock unit 16 in a manner to be described.

The detector 43 includes a decoder which will be described and which responds to a selected code from the dialing unit 16 to actuate the clamper and cause it to unblock the amplifiers 32 and 34. The clamper also now permits the pen lifter solenoid 42 to raise the pen 37 upon the receipt of the detected signal from the detector 40. This actuation of the clamper takes place only when a calling signal corresponding to that selected for the particular receiver is received over the transmission line 19, or, in a manner to be described, when the local transmitter is operated.

The detector responds to any calling signal on the common transmission line 19 to block the unit 16. This is to prevent any transmitter from being operated while the common line is being used. The details of this interlock control will be described subsequently.

Figure 2:
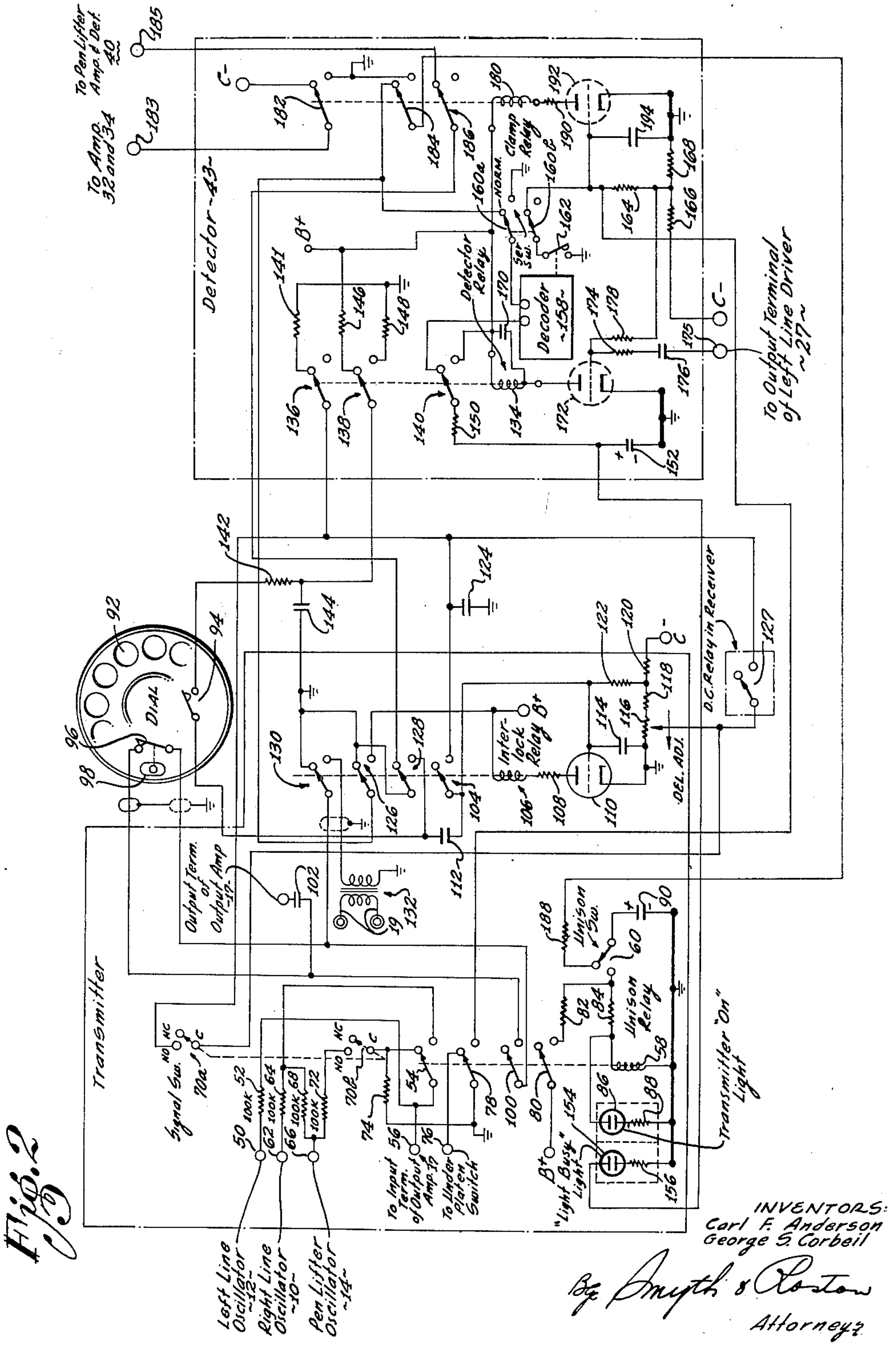
FIGURE 2 is a circuit diagram of portions of the system of FIGURE 1 and illustrates particularly certain control units incorporated into the system for achieving the desired selective calling features and other desirable control effects of the invention.
Figure 3:
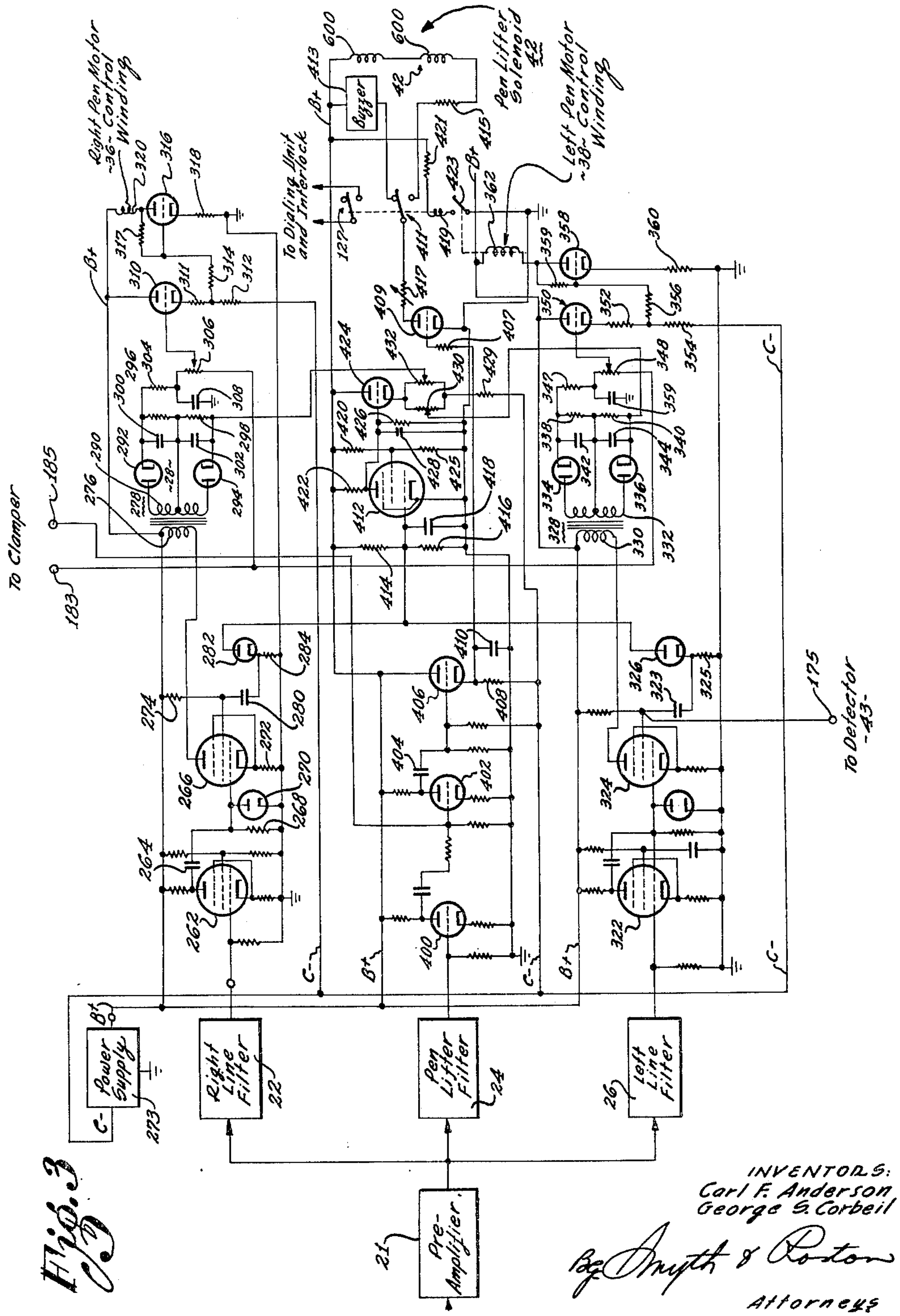
FIGURE 3 is a circuit diagram of other portions of the system of FIGURE 1, particularly illustrating the receiver portion of the system to demonstrate how that portion responds to certain control effects from the local and distant transmitters, and also showing how the receiver portion initiates other control effects in response to certain transmitted signals.

Suitable circuits and systems are shown in FIGURES 2 and 3 for accomplishing the functions represented by the blocks shown in FIGURE 1. Equipment for use at the transmitting station is shown in FIGURE 2, together with a circuit for the detector 43 of the associated receiver. Other receiving circuits are shown in FIGURE 3.

With reference now to FIGURE 2, it will be noted that the left line oscillator 12 of FIGURE 1 is connected to an input terminal 50 of the transmitter control circuit. A resistor 52 connects the terminal 50 to the movable arm of a double-throw switch 54. This movable arm of the switch 54 is also connected to a terminal 56, which, in turn, is connected to the input terminal of the output amplifier 17 of FIGURE 1. The switch 54 is included in a unison relay, and it is under the control of a unison relay winding 58, the movable arm of this switch normally engaging its upper fixed contact.

The unison relay referred to above is similar to that described in the copending applications referred to previously herein. This relay is under the control of a manually operated unison switch 60 which, in turn, is intended to be actuated by the stylus 18 at the transmitter. That is, the switch 60 is a double-throw push-button type, and its movable arm is normally spring biased into engagement with its upper contact. The arm is adapted to be depressed to its lower contact by the tip of the stylus 18.

The switch 60 is placed in a selected position with respect to the platen 20 so that the stylus 18 must be moved to a particular position before the switch 60 can be operated. This particular position is so chosen that the receiver pens are automatically moved to their rest positions before the signals to the receivers are commenced or interrupted by the actuation of the switch 60. This assures that there will be no abrupt movements of the receiver pens when the switch is actuated, with resulting ink spillage and with the possibility of damage to the linkage mechanisms at the receiver.

The right line oscillator 10 of FIGURE 1 is connected to an input terminal 62. A resistor 64 connects the input terminal 62 to the lower fixed contact of the switch 54. The pen lifter oscillator 14 of FIGURE 1 is connected to an input terminal 66, and a resistor 68 connects this terminal to the common junction of the resistor 64 and the lower contact of the switch 54.

The transmitter also includes a pair of ganged double-pole double-throw push-button switches *70a* and *70b*. These switches are used to transmit a signal at the termination of a message in order to apprise the operators at the various receivers that a message has been received. The movable arms of the switches *70a* and *70b* are mechanically inter-coupled, and they are normally in engagement with respective neutral contacts. A resistor 72 connects the input terminal 66 to the other contact of the switch *70b*. A resistor 74 connects the movable arm of the switch *70b* to ground. This movable arm is also connected to the upper fixed contact of the switch 54.

The movable arm of the under-platen switch 15 of FIGURE 1 is grounded, and the fixed contact of that switch is connected to a terminal 76 in FIGURE 2. The terminal 76 is connected to the upper fixed contact of a double-throw switch 78. This switch is also included in the unison relay and is under the control of the unison relay winding 58. The movable arm of the switch 78 is grounded.

A double-throw switch 80 is also included in the unison relay to be controlled by the unison relay winding 58. The movable arm of the switch 80 is connected to the positive terminal B+ of a source of direct voltage. The upper fixed contact of this switch is neutral, and a resistor 82 connects its lower fixed contact to the lower fixed contact of the unison switch 60. The lower fixed contact of the unison switch is also connected to one terminal of a resistor 84, the other terminal of this resistor being connected to one side of the unison relay energizing winding 58. The other side of the unison relay winding is grounded.

A neon indicating lamp 86 and a resistor 88 are series-connected in shunt with the relay winding 58, and it glows whenever the winding is energized. A capacitor 90 is connected between the movable arm of the unison switch 60 and ground.

The transmitter includes a dialing mechanism (indicated in FIGURE 1 as included in the dialing unit 16). This mechanism in turn includes a manually-operated dial 92 which is actuated in a manner similar to that of a common telephone. The dialing mechanism also includes a switch 94 which is closed whenever the dial 92 is moved from its neutral position. The dialing mechanism further includes a normally closed switch 96 which is actuated by a cam schematically shown at 98. The cam 98 opens the switch 96 for a brief interval for each digit dialed by the dial 92. The fixed contact of the switch 96 is connected to the lower contact of a double-throw switch 100 which is also included in the unison relay to be controlled by the unison relay winding 58. The upper contact of the switch 100 is open-circuited, and the movable arm of this switch is connected back to the movable arm of the switch 96. The lower contact of the switch 100 is also connected to a coupling capacitor 102 which couples the output terminal of the output amplifier 17 to this contact.

The movable arm of the switch 94 is normally connected to the upper contact of a double-throw switch 104. The switch 104 is included in an interlock relay which also includes an energizing winding 106 and whose function will be described. One side of the winding 106 is connected to the positive terminal B+ of the source of direct voltage. A resistor 108 connects the other side of this winding to the anode of a triode 110. The cathode of the triode is grounded, and its control grid is connected to the movable arm of the switch 104. A capacitor 112 is shunted between the upper contact of the switch 104 and its movable arm.

A capacitor 114 is connected between the control grid of the triode 110 and ground. A potentiometer 116 has one of its terminals connected to ground, and the other terminal of this potentiometer is connected to a resistor 118. A resistor 120 connects the resistor 118 to the negative terminal C− of a source of direct biasing voltage, and a resistor 122 connects the control grid of the triode 110 to the common junction of the resistors 118 and 120.

The movable arm of the potentiometer 116 is connected to the movable arm of the portion *70a* of the push-button signalling switch. The lower fixed contact of the switch 104 is connected to the active fixed contact of the portion *70a* of the signalling switch, and a capacitor 124 is connected between these fixed contacts and ground. A double-throw switch 127 also has its movable arm connected to the movable arm of the portion *70a* of the signalling switch, and the switch 127 has its lower fixed contact connected to the active fixed contact of the portion *70a* of the signalling switch.

The movable arm of the switch 127 normally engages its upper fixed contact which is inactive. The switch 127 is included a control relay at the receiver, which will be described, and this switch closes whenever the receiver is conditioned to transcribe a received message. That is, the movable arm of the switch 126 closes with its lower contact when the particular receiver has been called from a remote point, or when that receiver's transmitter is sending out a message which is being monitored by the particular receiver.

The other side of the energizing winding 106 for the interlock relay is connected to the positive terminal B+ of the source of direct voltage (as noted above) as is the lower fixed contact of a double-throw switch 126 included in the interlock relay and controlled by that winding. The upper fixed contact of the switch 126 is grounded, as is the movable arm of a double-throw switch 128 which is also included in the interlock relay and controlled by the winding 106. The winding 106 also controls a double-throw switch 130 which is included in the interlock relay. The upper fixed contact of the switch 130 is grounded, and its lower fixed contact is connected to one side of the primary winding of an impedance matching transformer 132. The other side of the primary winding of the transformer 132 is grounded, and the secondary winding of the transformer is connected to the transmission medium 19, which may conveniently be a telephone line. The movable arm of the switch 130 is connected to the movable arm of the switch 100 in the unison relay and controlled by the unison relay winding 58.

The movable arms of the switches 104, 126, 128 and 130 of the interlock relay normally engage their respective upper fixed contacts. These switches are moved together to their respective lower fixed contacts when the winding 106 is energized. The winding 106 is energized whenever the triode 110 is rendered conductive.

The movable arms of the switches 54, 78, 80 and 100 of the unison relay are normally in engagement with their respective upper fixed contacts. Whenever the winding 58 is energized, these arms are moved together into engagement with their respective lower fixed contacts.

The detector includes what shall be termed a "detector" relay, which, in turn, includes an energizing winding 134. This relay also includes a series of double-throw switches 136, 138 and 140. The movable arms of these switches are normally in engagement with their respective upper fixed contacts. However, when the winding 134 is energized, these arms are moved together into engagement with their lower fixed contacts.

The movable arm of the switch 136 is connected to the active fixed contact of the portion 70*a* of the signal switch. The lower fixed contact of the switch 136 is inactive, and a resistor 14 connects the upper fixed contact of this switch to ground.

The movable arm of the switch 138 is connected to a resistor 142 which, in turn, is connected to the fixed contact of the dial switch 94. A capacitor 144 is connected between the movable arm of the switch 138 and ground. A resistor 146 connects the upper fixed contact of the switch 138 to the positive terminal B+ of the source of direct voltage. The lower fixed contact of the switch 138 is connected to a grounded resistor 148.

A resistor 150 and a series-connected capacitor 152 are connected between the movable arm of the switch 140 and ground. The common junction of the resistor 150 and of the capacitor 152 is connected through a resistor 151 to a neon lamp 154 at the transmitter associated with the particular receiver. A resistor 156 connects the neon lamp 154 to ground. It should be pointed out that the neon lamp 86 indicates when the particular transmitter is "on," and the neon lamp 154 indicates when the common medium 19 is "busy."

The upper fixed contact of the switch 140 is connected to a first input terminal of a decoder unit 158. The other input terminal of the decoder unit is connected to the movable arm of a double-pole double-throw test switch 160*a* which is ganged to a similar switch 160*b*. The movable arm of the test switch 160*a* normally engages the upper fixed contact, which is connected to the movable arm of the switch 126 in the interlock relay. The lower contact of the switch 160*a* is grounded.

The decoder 158 is a standard unit and may have the form, for example, of a rotary stepping switch. The decoder may, for example, respond to the interruptions in the energizing of the detector relay to close the movable arm of a switch 162 onto a grounded fixed contact upon the receipt of series of such interruptions corresponding to an appropriate code.

The decoder unit 158 may be constructed, for example, to be operated when a pulse is introduced across its input terminals. Then, for each such pulse, the decoder unit steps one position. For a particular coding sequence, for example, the unit may be adjusted so that for a first set of six pulses, it moves to a hold position; then, for a second set of five pulses, it moves to a second hold position in which the switch 162 is closed. For all other numbers of pulses, the decoder drops back to its neutral position. For example, should the first set of pulses be seven instead of six, the decoder would not be arrested at a hold position and it would drop to its neutral position at the end of that set. Then, the second set of pulses would not lift it to its second hold position so that once more it would drop back to zero, or perhaps be established at an intermediate hold position. In any event, the switch 162 is not closed for the above adjustments of the coding unit except upon the receipt of the appropriate 6—5 code.

The movable arm of the switch 162 is connected to the movable arm of the switch 160*b*. The movable arm of the switch 160*b* normally engages its upper contact which is connected to one terminal of a resistor 164. The lower contact of the switch 160*b* is inactive. The resistor 164 is connected to the common junction of a pair of resistors 166 and 168. These latter resistors are connected as a voltage divider between the negative terminal C— of the direct voltage biasing source ground.

The lower fixed contact of the switch 140 is connected to one side of the energizing winding 134. This winding is shunted by a capacitor 170. The other side of the winding 134 is connected to the anode of a triode 172. The cathode of the triode is grounded, and the control grid of the triode is connected to a resistor 174. This resistor is coupled by a capacitor 176 to an output terminal 175 of the left line driver stage 27 of the receiver of FIGURE 1. A resistor 178 is connected between the control grid of the tube 172 and the common junction of the resistors 166 and 168.

The detector 43 also includes a clamp relay which, in turn, includes an energizing winding 180. A series of double-throw switches 182, 184 and 186 are also included in the clamp relay and these switches are controlled by the energizing winding. These switches normally have their movable arms in engagement with their respective upper fixed contacts. However, when the winding 180 is energized, these movable arms are moved in unison into engagement with their respective lower fixed contacts.

The upper fixed contact of the switch 182 is connected to the negative terminal C— of the source of direct biasing voltage. The movable arm of the switch 182 is connected to an output terminal 183, which is connected to the amplifiers 32 and 34 in the receiver of FIGURE 1 to mute these amplifiers in the manner mentioned above and as will be described in detail subsequently. The lower fixed contact of the switch 182 is grounded.

The upper fixed contact of the switch 184 is connected to the movable arm of the switch 126 in the interlock relay. The lower fixed contact of the switch 184 is grounded. The movable arm of the switch 184 is connected to a resistor 188 which, in turn, is connected to the upper fixed contact of the unison switch 60.

The movable arm of the switch 186 is connected to the upper fixed contact of the switch 128 in the interlock relay. The upper fixed contact of the switch 186 is connected to a terminal 185 which, in turn, is connected to the pen lifter amplifier 40 of FIGURE 1 for the reasons described above and as will be discussed more fully subsequently. The lower fixed contact of the switch 186 is inactive.

One side of the energizing winding 180 is connected to the positive terminal B+ of the source of direct voltage. A resistor 190 connects the other side of the energizing winding to the anode of a diode 192. The cathode of this diode is grounded, and its control grid is connected to the upper fixed contact of the portion 160*b* of the test switch. A capacitor 194 is connected between the control grid and ground.

In a constructed embodiment of the circuit of FIGURE 2, the following constants were used, and these are listed merely by way of example:

| | |
|---|---|
| Resistor 52 | 100K |
| Resistor 64 | 100K |
| Resistor 68 | 100K |
| Resistor 72 | 100K |
| Resistor 74 | 47K |
| Resistor 82 | 12K |
| Resistor 84 | 1.2K |
| Capacitor 90 | 20 mf. |
| Resistor 188 | .68K |
| Capacitor 102 | 10 mf. |
| Capacitor 112 | .1 mf. |
| Resistor 108 | 6.8K |
| Resistor 142 | 2.2 meg. |
| Capacitor 144 | .1 mf. |
| Capacitor 114 | .1 mf. |
| Potentiometer 116 | 10K |
| Resistor 118 | 8.2K |
| Resistor 120 | 8.2K |
| Resistor 122 | 1 meg. |
| Capacitor 124 | 20 mf. |
| Capacitor 152 | 20 mf. |
| Resistor 150 | .68K |
| Resistor 141 | .68K |
| Resistor 146 | 4.7 meg. |
| Resistor 148 | .68K |
| Capacitor 170 | .02 mf. |
| Resistor 174 | 100K |
| Capacitor 176 | .001 mf. |
| Resistor 178 | 1 meg. |
| Resistor 164 | 1 meg. |
| Resistor 166 | 270K |
| Resistor 168 | 68K |
| Capacitor 194 | .1 mf. |
| Resistor 190 | 6.8K |
| B-plus | 250 volts |
| C-minus | 150 volts |
| Triode 110 | 6C–4 |
| Triode 172 | 12AU–7 |
| Triode 192 | 12AU–7 |

The operation of the system thus far described is briefly as follows:

Prior to the actuation of any of the controls shown in FIGURE 2, all the switches shown in FIGURE 2 are in their illustrated positions. Since a continuous circuit to the output transformer 132 must be made through the normally open lower contact of the switch 130 in the interlock relay, no connection can be made to the line 19 until the interlock relay winding 106 is energized. The interlock relay is energized by the actuation of the dial 92 in a manner to be described. The switch 130 prevents any signal from reaching the line 19 unless the dialing operation has been made.

It should also be noted that the capacitor 144 is now fully charged as a result of the connection through the upper contact of the switch 138 in the detector of the associated receiver to the positive terminal B+. It should also be noted that the capacitor 124 is now discharged due to the connection to ground through the upper contact of the switch 136 in the detector relay.

Now, when the dial 92 is actuated to initiate a call, the switch 94 closes and places the fully charged capacitor 144 between the control grid of the triode 110 and ground. This triode is normally biased to a non-conductive state by virtue of the connection of the resistor 122 to a negative voltage point between the voltage divider resistors 118 and 120. However, when the charged capacitor 144 is connected between the control grid and ground of this triode, the triode becomes conductive and the interlock relay winding 106 becomes energized. The movable arms of the switches 104, 126, 128 and 130 in the interlock relay now move to their lower contacts. This causes the switch 104 to connect the discharged capacitor 124 between the control grid of the triode 110 and ground. The capacitor 124 maintains the triode conductive until the capacitor has accumulated a sufficient negative charge from the biasing voltage source C— through a circuit including the resistances 120 and 122 to drive the triode to cut off.

Therefore, if a dialing operation should be made inadvertently and no further action should be taken, the interlock relay is energized for a time interval determined by the parameters of the time constant circuit including the capacitor 124. The interlock relay subsequently becomes de-energized to return the circuit to its original condition.

When the interlock relay winding 106 is energized by the first actuation of the dial 92, the movable arm of the switch 130 engages the lower contact of the switch in FIGURE 2 and completes a circuit through the transformer 132 to the transmission medium 19. The unison relay winding 58 is still de-energized and the circuits to the right line oscillator 10 and to the pen lifter oscillator 14 of FIGURE 1 are not completed because the movable arm of the switch 54 in the unison relay is out of engagement with its lower contact. However, a connection is completed to the left line oscillator from the terminal 50 through the resistor 52 to the terminal 56, from there through the output amplifier 17 of FIGURE 1 and through the coupling capacitor 102 and the normally closed dial contacts 96 to the movable arm of the switch 130 in the interlock relay and from there to the primary of the output transformer 132 for introduction to the transmission line 19.

Therefore, the actuation of the dial 92 closing the switch 94 places the left line oscillator signal on the transmission line 19. Then, as the dial 92 is moved to a selected digit and released, this left line signal in interrupted a number of times, depending upon the digit to which the dial was moved, these interruptions being caused by the cam 98 actuating the switch 96.

As soon as the left line signal is placed on the medium 19 such as a telephone line, it is received by all the receivers in the system, including the one associated with the particular transmitter. The received signal is amplified in the left line driver stage 27 of FIGURE 1 and is introduced to the control grid of the triode 172 to energize the winding 134 of the detector relay. This causes the movable arms of the switches 136, 138 and 140 of the detector relay to become pivoted into engagement with the lower fixed contacts of the switches. The energizing of the detector relay causes the switch 138 to connect the capacitor 144 to ground and discharge this capacitor. It also causes the movable arm of the switch 136 to move to its inactive lower contact to interrupt the discharge path for the capacitor 124. This actuation of the switch 136 enables the capacitor 124 to become charged by the C— voltage source as previously described so as to return the circuit to its original condition if no further action is taken after an initial operation of the dial 92.

As the dialing operation causes left line signal to be successively interrupted by the actuation of the switch 96, the detector relay winding 134 is successively de-energized in correspondence with such interruptions of the left line signal. Each time the relay winding 134 is de-energized, the movable arm of the switch 136 falls back on its upper contacts to discharge the capacitor 124 and to remove any negative charge that might have accumulated on that capacitor. Each dialing operation, therefore, initiates a new time interval at the end of which the circuit is returned to its initial condition.

Each interruption of the left line signal during the dialing operation also causes the movable arm of the switch 140 to engage the upper fixed contact of the switch. This disconnects the capacitor 152 from the positive terminal B+ and connects the charged capacitor across the input terminals of the decoder 158. The circuit through the decoder 158 is completed to ground through the portion 160*a* of the test switch and through the switch 126 in the interlock relay. This permits the circuit to be completed through the decoder 158 only when the interlock relay of its associated transmitter is not energized. This prevents a transmitter from being conditioned to call up its own receiver.

Therefore, when a distant transmitter is being actuated and when the local interlock relay is not energized, a received left line signal energizes the winding 134 of the detector relay, and each interruption of that signal causes the capacitor 152 to discharge through the decoder 158 and move the decoder one step. Interruptions of the left line signal put on the line by the local transmitter have no effect, however, on the decoder 158. This is because the capacitor 152 is connected to B-plus when the switch 140 is closed on its upper contact, this being due to the condition of the switch 126 in the energized interlocked relay.

At the called receiver, the decoder is set to close the switch 162 upon the completion of the dialing operation corresponding to its code sequence. This effectively connects the control grid of the triode 192 to ground to cause that triode to conduct. The conductivity of the triode 192 is so established because the negative bias normally introduced to the control grid of the triode by the resistor 164 is removed. This removal results from the fact that the resistor 164 is short circuited by the closure of the switch 162 when the portion 160*b* of the test switch is in its illustrated position.

The conductivity of the triode 192 energizes the clamp relay 180 and causes the movable arms of the switches 182, 184, and 186 in the clamp relay to move to the lower fixed contacts of the switches. This actuation of the clamp relay switch 182 removes the muting negative bias from the amplifiers 32 and 34 so that these amplifiers are able to translate and amplify signals introduced to them. The actuation of the clamp relay switch 186 removes the ground from the pen lifter amplifier 40 to enable the pen lifter solenoid 42 to operate normally.

In the manner described above, therefore, the clamping action is removed from the particular called receiver, so that the called receiver is able to utilize the left and right line signals subsequently sent to it from the transmitter.

Normally, the receiver associated with the particular calling transmitter will not have its decoder operated to close its switch 162 when a distant station is called. However, it is desired that the local receiver be placed in an active condition at this time so that it can monitor the transmission from its transmitter. This activation of the local receiver is accomplished by the connection from the lower contact of the switch 78 in the unison relay in the transmitter to the control grid of the triode 192. When the transmitter is turned on by energizing its unison relay, the switch 78 places a ground on the grid of the triode 192 in the local receiver to operate the clamp relay and to enable the local receiver to monitor the transmission.

It should be noted that the decoder 158 at the receiver can be tested by depressing the ganged test switches 160*a* and 160b. The depression of the switch 160*a* places a ground directly on the decoder input terminal and allows the decoder to respond to the pre-set code sequence when that sequence is dialed by the dial of the local transmitter. The depression of the switch 160*b* prevents the actuation of the switch 162 by the decoder during the test from having any effect on the system. This results from the fact that the movable arm of the switch 160*b* engages a fixed contact having no electrical connections when the switch is depressed.

The system is now in a condition in which the detector relay 134 and the clamp relay 180 at the called receiver have been energized. Furthermore, the system is now in a condition in which the interlock relay 106 at the calling transmitter and the detector relay 134 of the local receiver have been energized, but in which the clamp relay 180 of the local receiver has not yet been energized.

The movable arm of the detector relay switch 140 is held in engagement with its lower contact at the completion of the dialing operation. Because of this, the neon lamp 154 is energized since the switch 140 now connects the lamp to the positive terminal B+. It should be pointed out that the detector relays of all the receivers in the system are continuously energized after a call to one of the receivers has been made, regardless of whether a particular receiver is the one called or not. This results from the fact that the driver 27 in each receiver introduces a signal to the grid of the tube 172 in each receiver to render the tube conductive. However, only the clamp relay of the called receiver is energized. This results from the fact that the clamp relay 180 at a receiver becomes energized only when the decoder at the receiver has received the proper sequence of signals.

It should also be pointed out that this continuous energizing of the detector relays of all the receivers in each instance causes the capacitor 144 to be completely discharged through the lower contact of the switch 138. Therefore, even if the capacitor 144 should be connected to the grid of the triode 110 as a result of the subsequent actuation of a dialing mechanism and the resultant closure of the switch 94 associated with the dialing mechanism, the capacitor would be unable to render the triode conductive so as to energize the interlock relay 106. Therefore, even though the dial 92 is actuated at any transmitter associated with the remote receivers to close the switch 94, such closure is ineffective to energize the interlock relay winding 106. Therefore, all transmitters, except the calling transmitter, are prevented from using the now busy common transmission line 19. Also, the fact that the line 19 is busy is indicated by the glowing of the neon lamps 154 at all the transmitters.

Now that the dialing at the calling transmitter is complete, the detector relay winding 134 is continuously energized due to the continuous presence of the left line signal on the transmission medium 19. Furthermore, the capacitor 124 is continuously disconnected from its discharge path because the movable arm of the switch 136 is out of engagement with the upper contact of the switch. Therefore, the capacitor 124 now begins to accumulate a negative charge from the voltage dividers 118 and 120. Unless the unison switch 60 is actuated within a selected time interval of, for example, ten seconds, the capacitor 124 will obtain sufficient negative charge to render the triode 110 non-conductive and return the system to the condition of the system before the actuation of the dial 92. Therefore, the unison switch 60 must be actuated within ten seconds after the dialing operation is completed.

The capacitor 90 is fully charged just before the unison switch is operated, this resulting from its connection through the resistor 188 and through the upper contact of the switch 184 in the clamp relay of the local receiver (which relay is still not energized) and through the lower contact of the switch 126 of the interlock relay to the positive terminal B+. The interlock relay switch 126 prevents the unison switch 60 from being effective until the dial 92 has been operated. This is to prevent subsequent circuit closures after a premature energizing of the unison relay from producing undesired sudden jerks on the receiver pen.

The actuation of the unison switch 60 places the fully charged capacitor 90 across the unison relay winding 58 to energize that winding. When the winding is energized, the switch 80 of the unison relay completes a holding circuit for the winding to the positive terminal B+ through its lower contact. The switch 100 of the unison relay effectively closes across the dial contacts 98 so that any subsequent dialing is ineffective. The unison relay switch 78 removes a ground from the underplaten switch 15 to enable that switch to operate normally. The switch 78 also places a ground on the control grid of the tube 192 to render the tube conductive and energize the relay 180 in the local receiver. By energizing the relay 180 in the local receiver, the receiver is able to receive signals representing the movements of the stylus at the local transmitter, as previously described. The unison relay switch 54 closes on its lower contact to place the right line signal and the pen lifter signal on the terminal 56 for application to the transmission medium together with the previously applied left line signal. This circuit is completed through the terminal 56, the output amplifier 17, the capacitance 102, the switch 96, the switch 130 and the transformer 132.

When a monitored or called receiver is unclamped, the "left pen" motor 38 of FIGURE 3 activates the left lever turn or switch 423 of FIGURE 3. This in turn energizes relay 419 of FIGURE 3 which closes switch 127. The closure of the switch 127 introduces a slightly negative bias to the control grid of the tube 110 and to the capacitor 124. This bias is adjustable by controlling the movable arm of the potentiometer 116. The resulting bias is such that the tube 110 is maintained conductive and the capacitor 124 is maintained at a fixed negative charge so long as the switch 127 is closed. The switch 127 now functions to hold the interlock relay winding 106 energized. As will be seen, the switch 127 must be closed within the time interval of the time constant circuit, including the capacitor 124, or else this capacitor will obtain sufficient negative charge to render the tube 110 nonconductive and to return the system to the condition it was in prior to dialing. The operator, therefore, has a limited time interval in which he must actuate the unison switch 60 or else the system will be returned to its original state.

When the unison relay winding 58 is energized, the transmitter is conditioned to introduce the signals from the three oscillators 10, 12 and 14 to the transmission medium 19 and to its associated receiver. When the relay winding 58 is so energized, the neon lamp 86 glows to indicate that the transmitter is "on."

The called receiver and the local monitor receiver now receive the signals from the oscillators 10, 14 and 12. The filter 22 of the receiver of FIGURE 1 passes the frequency-shifted signal from the right line oscillator 10, and this signal is amplified in the drive 23 and detected in the discriminator 28. The discriminator 28 introduces a linearly varying direct voltage to the amplifier 32, which in turn causes a linearly varying direct current to flow through the control winding of the right pen motor 36 in correspondence with the right diagonal motions of the stylus 18 at the transmitter.

In like manner, the filter 26 selects the frequency-shifted signal from the left line oscillator 12 and introduces that signal to the driver 27. The driver 27 amplifies the left line signal and introduces it to the discriminator 30. The resulting detected voltage is amplified in the amplifier 34 and converted to a direct current through the control winding of the left pen motor 38.

The motors 36 and 38 cause the pen 37 to move across its recording medium 39 in correspondence with the motions of the stylus 18 at the transmitter. Therefore, any handwritten message inscribed by the stylus 18 is instantaneously reproduced by the pen 37.

Whenever the stylus 18 is pressed down on the platen 20, the switch 15 opens. This causes the signal introduced by the pen lifter oscillator 14 to the transmission medium to have an appropriate frequency for selection of that signal by the filter 24. The selected signal is detected in the detector 40 to obtain a direct current for the pen lifter solenoid 42. The solenoid 42 is energized to lift the pen 37, therefore, whenever the stylus 18 is lifted up from the platen 20 to close the switch 15.

Since the clamping relay winding 180 at the local monitor receiver is now energized, the movable arm of the clamping relay switch 184 is closed on its grounded lower contact. This places a ground on the capacitor 90 and discharges that capacitor. At the termination of the message, the unison switch 60 is again actuated. This places the discharged capacitor 90 across the unison relay winding 58 momentarily to de-energize that winding and cause the holding circuit switch 80 to return to the upper contact of the switch. The unison relay winding 58 is now de-energized and the movable arms of the unison relay switches 54, 78, 100 and 80 are now returned to the upper contacts of the switches.

The return of the unison relay switch 100 to the upper contact again enables the dialing mechanism to be actuated. The unison relay switch 78 now short-circuits the under-platen switch 15 so that the pen lifter oscillator 14 is constrained to maintain on the medium 19 the signal that will be selected by the filter 24, regardless of the actual position of the switch 15. This causes the stylus to be moved from the platen so as to prevent the recording of any messages. The switch 78 also removes the ground from the control grid of the triods 192 of the monitor receiver so that the clamp relay winding 180 is again de-energized. The unison relay switch 54 removes the right line and the pen lifter signals from the input terminal of the output amplifier and from the transmission line 19.

Therefore, at this time, only the left line signal remains on the medium to hold energized the detector relays of all the receivers in the system. When the left pen motor is turned off, switch 423 opens which de-energizes relay 419 and opens switch 127. This removes the fixed negative bias from the control grid of the triode 110. This triods remains conductive, however, until the capacitor 124 accumulates a sufficient negative charge to render the triode nonconductive. Unlike the condition of this capacitor during the dialing operation, it has a residual negative charge when the switch 126 opens; this negative charge being controlled by the adjustment of the movable arm of the potentiometer 116. A relatively short time is required, therefore, before this capacitor 124 will accumulate a sufficient negative charge to render the triode 110 non-conductive. This latter time interval, for example, may be from two to four seconds.

Within the time interval described in the preceding paragraph, the operator at the transmitter can control the paper-shift mechanism at the previously called receiver to shift the recording paper at the receiver in accordance with well known telescribing techniques. The operator can then initiate a new message to that receiver by re-actuating the unison switch 60 and without the need for recalling that receiver. Also, within the particular time interval, he can actuate the signal switches **70*a* and 70*b*** to signal the previously called receiver and inform the operator at that receiver that a message has been completed.

Actuation of the signalling switches **70*a* and 70*b* at any time within the proper time interval causes the switch 70*a* to connect the capacitor 124 to the movable arm of the potentiometer 116 and return that capacitor to the charged state it was in at the termination of the message. This reinitiates the time interval of two to four seconds required for the capacitor 124 to accumulate a sufficient negative charge for cutting off the triode 110**. Therefore, the previously called receiver can be repeatedly signalled at the end of each message without losing the connection, this being so long as each successive signalling operation is made within the particular time interval.

When actuated, the switch **70*b* connects the pen lifter signal from the terminal 66 through the upper contact of the switch 54 to the input terminal of the output amplifier 17 of FIGURE 1 for transmission to the called receiver. It will be appreciated that only the called receiver is unclamped at this time because only the circuit in the called receiver from the control grid of the triode 192 is completed through the decoder contact 162 to ground. All other receivers including the local monitor receiver are clamped. Also, the pen lifter oscillator signal 14, as previously noted, is maintained by the switch 78 in the unison relay at the frequency selected by the filter 24**.

Therefore, when the signal switches 70*a* and 70*b* are depressed, the pen lifter signal is utilized by the previously called receiver only. In a manner to be described, when the left pen motor is turned off to cause the switch 127 at the called receiver to be opened, another switch closes to connect the pen lifter signal to a signaling buzzer rather than to the pen lifter solenoid 42. Therefore, the actuation of the signal switches 70*a* and 70*b* causes a buzzer to be energized only at the called receiver to apprise the operator at that station that a message has been transcribed at his receiver.

When the signal switches 70*a* and 70*b* are released, the capacitor 124 gradually accumulates a sufficient negative charge eventually to render the triode 110 nonconductive so as to de-energize the interlock relay and to break the connection to the previously called receiver. When the interlock relay winding 106 becomes de-energized, the switch 130 moves to its upper contact and removes the left line signal from the transmission medium 19. This causes the detector relays in all the receivers to be de-energized.

It should be noted that the de-energizing of the detector relay at the called receiver causes the movable arm of the relay switch 140 to move to the upper contact of the switch. The de-energizing of the detector relay also causes the charged capacitor 152 to discharge through the decoder and through the upper contact of the switch 126 in the de-energized interlock relay. This causes the decoder to move one step from its "hold" position, thereby causing it to be returned to neutral. The decoder is, therefore, cleared and the decoder switch 162 at the previously called receiver is opened. This causes the triode 192 again to be rendered nonconductive so that the clamp relay winding 180 is de-energized and the called receiver is returned to a clamped muted condition.

Now, should the local receiver receive a call from a distant calling transmitter, the first thing that appears on the common medium 19 is the left line signal from that transmitter. This signal causes the detector relay 134 at the local receiver and at all receivers in the system to be energized and all the "busy" neon lamps 154 to glow. Then, in the manner described, the detector relay switch 138 causes the capacitor 144 to be discharged through the lower contact of that switch so that the local dialing mechanism is ineffective to cause the interlock relay winding 106 to be energized. In this manner, the dialing mechanisms at all the transmitters except the calling transmitter are rendered ineffective. Therefore, no other transmitter can cut into the busy common medium 19.

The left line signal from the calling transmitter is then interrupted by the dialing mechanism of the calling transmitter in accordance with the predetermined code. If the code does not correspond to the particular decoder 158 at the local receiver, the decoder switch 162 at the local receiver is not closed and the clamp relay winding 180 is not energized so that the receiver remains clamped. However, if the local receiver is the one called, its decoder 158 closes the decoder switch 162 and causes its clamp relay to be energized in the described manner. This permits the called receiver to receive and inscribe the transmitted message.

It is possible in the system described above to provide for the elective communication between any of the transmitters and a selected group of the receivers. In fact each receiver may have an individual code call and group code call. When a group call is made, the decoders 158 of a group of receivers, rather than a single receiver close the respective decoder contacts 162.

It should be noted that the only connections between the transmitter and the distant receivers is over the transmission medium 19. All the controls are made over this medium by interrupting either the left line or right line signals and by the pen lifter signal. It should also be noted that the use of the particular signals for the described controls can be reversed. That is, for example, the right line signal could be used to control the detector relay winding 134. Likewise, either the right line signal or the left line signal could be used for signaling purposes instead of the pen lifter signal, if so desired.

In the circuit diagram of FIGURE 3, certain of the blocks of the receiver portion of the system of FIGURE 1 are shown in circuit detail so that the description of the system may be complete. It should be pointed out that the circuitry of FIGURE 3 is essentially similar to that disclosed in copending application Ser. No. 615,834 mentioned previously.

In the circuit diagram of FIGURE 3, the output terminal of the filter 22 is connected to the control grid of an electron discharge tube 262. The tube 262 is preferably a pentode, and it is connected as a usual amplifier circuit. A coupling capacitor 264 is connected between the anode of the tube 262 and the control grid of an electron discharge tube 266. The tube 266 is also preferably a pentode, and it is connected as a self-biased amplitude limiter. The control grid of the tube 266 is connected to a grounded resistor 268. A diode 270 has its anode connected to the control grid of the tube 266 and has its cathode connected to ground. The cathode of the tube 266 is connected to a grounded resistor 272 and the screen grid of the tube is connected to a resistor 274, which, in turn, is connected to the positive terminal B+ of the power supply 273. This screen grid is also connected to the terminal 175 for connection to the detector relay circuit of FIGURE 2.

The suppressor electrode of the tube 266 is connected to the cathode, and the anode of the tube is connected to one terminal of the primary winding 276 of a frequency discriminator transformer 278 associated with the right line frequency discriminator 28 of FIGURE 1. The other terminal of this primary winding is connected to the positive terminal B+ of the power supply. A capacitor 280 is connected between the screen grid of the tube 266 and the cathode of a diode 282. A resistor 284 connects the diode cathode to ground.

A secondary winding 290 of the frequency discriminator transformer 278 has one terminal connected to the anode of a diode 292, and its other terminal is connected to the anode of a diode 294. A pair of series resistors 296 and 298 and a pair of series capacitors 300 and 302 are connected in shunt between the cathodes of the diodes 292 and 294. The secondary winding 290 has a center tap connected to the common junction of the capacitors 300 and 302 and to the resistor 296 and 298.

The cathode of the diode 292 is also connected to a resistor 304. This resistor is connected to one of the fixed contacts of a potentiometer 306. This fixed contact of the potentiometer is connected to a grounded capacitor 306, and its movable arm is connected to the control grid of a triode 310. The triode is connected as a cathode follower, and its anode is connected to the positive terminal B+ of the power supply 273.

Figure 4:
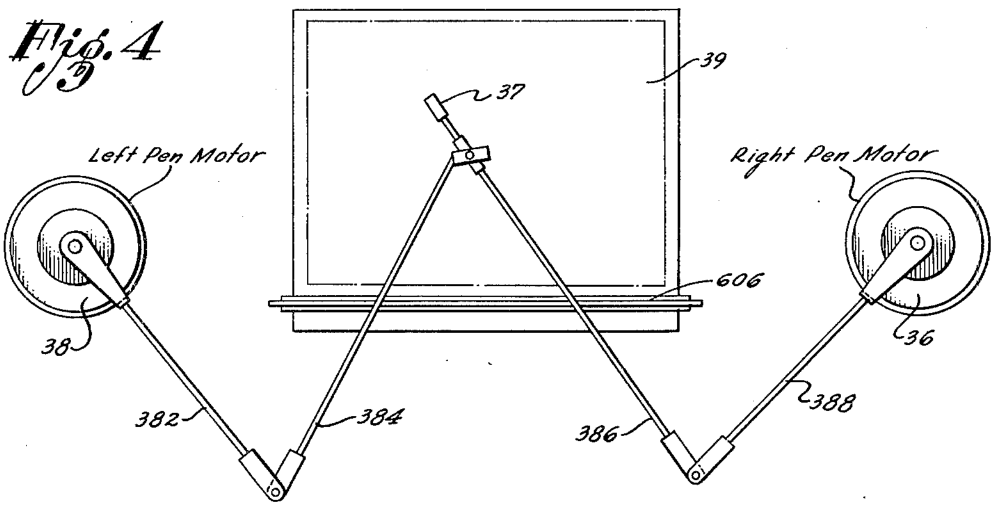
FIGURE 4 is a top plan view somewhat schematically illustrating the mechanical details of a linkage between a pair of drive motors and a recording pen at a receiving station.

A pair of resistors 311 and 312 is connected between the cathode of the triode 310 and the negative terminal C— of the power supply 273. A resistor 314 is connected between the common junction of the resistors 311 and 312 and the control grid of a triode 316. The triode 316 is connected as a direct current amplifier, and its cathode is connected to a grounded cathode resistor 318. A negative feedback resistor 317 is connected between the anode and the grid of the triode. The anode of the triode 316 is connected to one terminal of the control winding 320 of the right pen motor 36. The motor drives the receiver pen 37 (FIGURE 1) through a linkage which will be described in conjunction with FIGURE 4.

The left line filter 26 is coupled to an amplifier, including an electron discharge tube 322, which, like the tube 262, is connected as an amplifier. The anode of the tube 322 is coupled to the control grid of a tube 324. The tube 324, like the tube 266, is connected as a self-biasing amplitude limiter. The circuit of the tube 324 is essentially similar to that of the tube 266, and the screen grid of the tube 324 is, in like manner, coupled to a capacitor 323 which is connected to the cathode of a diode 326. The cathode of the diode 326 is connected to a resistor 325 whose other terminal is connected to ground.

The anode of the tube 324 is connected to one terminal of the primary winding 330 of a frequency discriminator transformer 328. The other terminal of this primary winding is connected to the positive terminal B+ of the power supply 273. This transformer 328 is associated with the left line frequency discriminator 30 of FIGURE 1. The secondary winding 332 of the transformer 328 has one terminal connected to the anode of a diode 334, and its other terminal is connected to the anode of a diode 336. A pair of series resistors 338 and 340 and a pair of series capacitors 342 and 344 are connected in shunt between the cathodes of the diodes 334 and 336. The secondary winding 332 of the transformer 328 has a center tap which is connected to the common junction of the resistors 338 and 340.

The cathode of the diode 338 is connected to one terminal of a resistor 347. The other terminal of this resistor is connected to one of the fixed contacts of a potentiometer 348. The other fixed contact of the potentiometer is connected to the terminal 183 of FIGURE 2, as is the other fixed contact of the potentiometer 306.

The first fixed contact of the potentiometer 348 is connected to a grounded capacitor 349. The movable arm of the potentiometer 348 is connected to the control grid of a triode 350. The triode 350, like the triode 310, is connected as a cathode follower. A pair of series resistors 352 and 354 is connected between the cathode of the triode 350 and the negative terminal C— of the power supply 273. The anode of the triode 350 is connected to the positive terminal B+ of the power supply.

A resistor 356 is connected from the common junction of the resistors 352 and 354 to the control grid of a triode 358. The triode 358, like the triode 316, is connected as a direct current amplifier. A negative feedback resistor 359 is connected between the anode and the control grid of this tube. The cathode of the triode 358 is connected to one terminal of a grounded resistor 360, and the anode of this tube is connected to one terminal of the control winding 362 of the left pen motor 38 of FIGURE 1. The other terminal of the motor winding 362 is connected to the positive terminal B+ of the power supply 273.

The motors 36 and 38 are linked to the pen 37 of FIGURE 1 in a manner similar to that described in Patent 2,355,087. This linkage is shown schematically in FIGURE 4, and, as illustrated in that figure, the left pen motor 38 is linked with the pen 37 through linkages 382 and 384, and the right pen motor is linked to the pen through linkages 386 and 388. The motors 36 and 38 cause the pen 37 to be moved over the writing surface 39 so as to duplicate the written message from the transmitting station and write the message on that recording medium.

The filter 24 orf FIGURE 3 is connected to the control grid of a triode 400. This triode and a further triode 402 are connected in cascade as a usual two-stage resistance-coupled amplifier. The terminal 185 of the clamper circuit of FIGURE 2 is connected to the control grid of the triode 402. A capacitor 404 is connected between the anode of the triode 402 and the control grid of a triode 406. The triode 406 is connected as a cathode follower detector and it, together with the circuits of the triodes 400 and 402, constitute the pen lifter amplifier and detector 40 of FIGURE 1. The cathode of the triode 406 is connected to one terminal of a resistor 408 and the other terminal of this resistor is connected to the negative terminal C— of the power supply 273. A capacitor 410 is connected between the cathode of the triode 406 and ground. The anode of the triode 406 is connected to the positive terminal B+ of the power supply 273.

The resistor 407 is connected between the cathode of the triode 406 and the control grid of a triode 409. The cathode of the triode 409 is connected to ground and the anode of this tube is connected through a rheostat 417 to the movable arm of a double-throw control relay switch 411. The relay switch 411 normally contacts its upper contact which is connected to one terminal of a buzzer 413. The other terminal of this buzzer is connected to the positive terminal B+ of the power supply 273. A resistor 415 connects the lower contact of the switch 411 to one terminal of the energizing winding for the pen lifter solenoid 42. The other terminal of this solenoid winding is connected to the terminal B+.

The relay switch 411 is controlled by a relay energizing winding 419. A resistor 421 connects one terminal of the winding 419 to the positive terminal B+ of the power supply 273. The other terminal of the relay winding 419 is connected to the fixed contact of a switch 423. The movable arm of the switch 423 is connected to ground. The movable arm is mechanically coupled to the left pen motor to be closed whenever that winding is energized.

Therefore, whenever the receiver is unclamped, the switch 423 is closed to energize the relay winding 419. This switch 127 referred to in conjunction with FIGURE 2 is included in this control relay and closes on its lower contact whenever the winding 419 is energized.

The anode of the diode 282 and the anode of the diode 326 are connected to the control grid of an electron discharge tube 412 which is preferably a pentode. This control grid is connected to the common junction of a pair of resistors 414 and 416, these resistors being connected as a voltage divider between the positive terminal B+ of the power supply 273 and ground. The resistor 416 is shunted by a capacitor 418. The cathode of the tube 412 is connected to ground, and the suppressor grid of this tube is connected to the cathode. A pair of resistors 420 and 426 are connected in series between the positive terminal B+ and ground to form a voltage divider, and the screen grid of the tube 412 is connected to the common junction of these resistors.

The anode of the tube 412 is connected through a resistor 422 to the positive terminal B+. This anode is further connected to the control grid of a triode 424. The tube 424 is connected as a cathode follower. A resistor 426 and a shunting capacitor 428 are connected between the control grid of the tube 424 and ground.

The anode of the tube 424 is connected to the positive terminal B+ of the power supply 273. A resistor 429 has one terminal connected to the negative terminal C— of the power supply, and a potentiometer 430 is connected between the cathode of the tube 424 and the other terminal of this resistor. A second potentiometer 432 is also connected between the cathode of the tube 424 and the other terminal of the resistor 429. The movable arm of the potentiometer 430 is connected to the cathode of the diode 336 in the left line frequency discriminator, and the movable arm of the potentiometer 432 is connected to the cathode of the diode 294 in the right line frequency discriminator.

The amplified signals from the pre-amplifier 21 are introduced to the filters 22, 24 and 26. The filter 22 selects the frequency-shifted right line signal from the right line oscillator 10, and this right line signal is amplified in the amplifier circuit of the tube 262. The amplified signal from the amplifier is introduced to the control signal of the tube 266. This latter tube, as previously noted, is connected as a self-biased amplitude limiter. That is, the positive peaks of the amplified signal from the tube 262 tend to produce grid current flow in the tube 266 and corresponding current flow through the diode 270. This current flow produces a negative voltage across the resistor 268 which persists due to the charge on the capacitor 264. The net result is that the control grid of the tube 266 is biased negatively by the signal from the tube 262 and by an amount determined by the amplitude of the signal. The negative bias is such that the negative peaks of the signal drive the out-put to cut off and are amplitude limited; whereas the positive peaks of the signal are clamped and amplitude limited by the diode 270 by the grid of the tube 266.

Therefore, any relatively rapid changes in the amplitude of the signal from the tube 262 due to noise, and the like, produce current flow in the diode 270 for the positive peaks and drive the tube 266 to cut off for the negative peaks. These changes, therefore, have no appreciable effect on the plate current of the tube 266.

The amplified, amplitude limited, frequency-shifted right line signal is passed, therefore, to the primary winding of the frequency discriminator transformer 278. The frequency discriminator circuit of the diodes 292 and 294 operate in known manner to convert the frequency changes of the signal current in the primary winding into voltage changes in its out-put circuit. Frequency discriminator circuits of this type exhibit linear characteristics through a relatively wide range when they are operated on both sides and through their zero output voltage point.

That is, for wide-range linear operation, the discriminator should be designed so that for the center signal frequency of, for example, 1700 cycles, zero voltage is normally developed across the resistors 296 and 298. Then, for an increase in frequency, a linearly related increasing voltage is developed across the resistors 296 and 298 in a positive sense. For a decrease in frequency, on the other hand, a linearly related negative voltage is increasingly developed across the resistors 296 and 298. In this manner, the frequency discriminator develops a voltage which increases with a linear relation on either side of zero for shifts in frequency of the signal current above and below the center frequency of, for example, 1700 cycles.

In much the same manner, the 2300 cycle left line signal from the filter 26 is amplified in the amplifier 322. The signal is then amplitude limited in the self-biased limiter circuit of the tube 324, and it is then introduced to the frequency discriminator 30 of the diodes 334 and 336. This latter frequency discriminator, like the discriminator 28, is preferably constructed so that, in normal operation, it develops an output voltage across the resistors 338 and 340 which increases linearly in a positive or negative direction on each side of zero as the signal from the filter 26 is shifted above or below its center frequency of, for example, 2300 cycles.

For precise and accurate control of the receiver pens, it is desirable (as noted above) for the discriminators 28 and 30 to be operated through their zero voltage points for wide-range linear response. Yet, for smooth and jerk-free operation of the receiver pen, and as discussed in detail in copending application Ser. No. 615,834, it is essential that the output voltages from the discriminators increase from zero in a unidirectional and preferably positive sense, instead of being bi-directional. These requirements are both met by means of the control circuit of the tubes 412 and 424. This control circuit is disclosed and claimed specifically in the copending application Ser. No. 615,834. This control circuit will be described briefly in the following paragraphs.

Whenever a signal from the left line oscillator 12 is received by the receiver and passed by the filter 26, and when this signal is amplified in the amplifier circuit of the tube 322 and amplitude limited in the circuit of the tube 324, a portion of the signal also appears at the screen grid of the tube 324. This portion is introduced to the terminal 175 to control the detector relay of FIGURE 2 in the described manner. The portion of the left line signal is also introduced through the capacitor 323 to the resistor 325 and appears across that resistor. The signal across the resistor 326 is rectified by the diode 326 and it appears as a negative direct voltage across the resistor 416 at the grid of the tube 412. The capacitor 418 functions as a filter capacitor.

Likewise, whenever a signal from the right line oscillator 10 is received at the receiving station and passed by the filter 22, and when this latter signal is amplified in the amplifier circuit of the tube 262 and amplitude limited in the circuit of the tube 266, a portion of the latter signal appears at the screen grid of the tube 266. This portion of the right line signal is introduced through the capacitor 280 to the resistor 284 and appears across that resistor. The signal across the resistor 284 is rectified in the diode 282 and is applied as a negative voltage to the grid of the tube 412.

A negative voltage from the diode 282, as introduced to the grid of the tube 412, is developed, therefore, whenever a signal is received from the right line oscillator 10 at the transmitter. Also, an additional negative voltage from the diode 326 is impressed on the control grid of the tube 412, therefore, whenever a signal is received from the left line oscillator 12 at the transmitter.

A forced positive bias is introduced to the control grid of the tube 412 by its connection to the common junction of the voltage divider resistors 414 and 416. This positive bias is such that, in the absence of received signals, grid current flows in the tube 412 and the tube is highly conductive. The high conductivity of the tube 412 causes a relatively high voltage to be developed across the resistor 422 in its plate circuit. This places a relatively low voltage on the grid of the cathode follower 424 so that the latter tube passes minimum current. This minimum current through the cathode follower 424 produces negative voltages across the potentiometers 430 and 432 due to their connection through the resistor 429 to the negative biasing terminal C—. Under these conditions, the movable arms of the potentiometers are established slightly below ground potential.

Now, should one of the signals from the oscillators 10 and 12 at the transmitter be received at the receiver station, the resulting negative voltage on the control grid of the tube 412 due to the rectifying action of the diodes 282 or 326 is insufficient to drive that control grid negative with respect to the grounded cathode of the tube. Therefore, grid current continues to flow in the tube 412, and there is no change in its plate current or in the condition of the control circuit of the tubes 412 and 424. However, when both signals from the oscillators 10 and 12 at the transmitter are received, the combined negative voltages introduced to the control grid of the tube 412 from the diodes 282 and 326 are sufficient, not only to drive that grid of the tube 412 negative with respect to its grounded cathode, but to drive the tube 412 beyond cut off.

The resulting rise in the potential of the anode of the tube 412 when it is driven to its nonconductive state causes the cathode follower 424 to become highly conductive. The high conductivity of the cathode follower 424 causes its cathode to swing positive and relatively large positive voltages appear at the movable arms of the potentiometers 430 and 432.

The positive voltage at the movable arm of the potentiometer 432 is introduced to the lower side of the resistor 298 of the discriminator 28. This voltage biases the discriminator and effectively shifts its operating axis so that its output voltage no longer swings about a voltage point slightly below zero, but it swings from substantially zero about a positive voltage point. This is achieved without affecting the linear properties of the discriminator. The movable arm of the potentiometer 432 may be adjusted manually to provide a desired amount of shift to the operating point of the discriminator 28. This shift may be such that, when the 1700 cycle signal from the right line oscillator 10 is frequency-shifted through its predetermined limits by movements of the stylus 18 at the transmitter, the resulting output voltage across the resistors 296 and 298 increases from a value approximately zero to a positive value.

Likewise, the positive voltage at the movable arm of the potentiometer 430 is impressed on the discriminator 30. The movable arm of the potentiometer 430 may be adjusted so that the frequency-shifted 2300 cycle signal from the left line oscillator 12 produces an output voltage across the resistors 338 and 340 that varies between substantially zero and a positive value when the frequency of the left line signal is shifted within its predetermined limits.

A portion of the output voltage appearing across the resistors 296 and 298 appears across the potentiometer 306 and is introduced to the control grid of the cathode follower 310. The cathode follower is so biased that the voltage at the junction of its cathode resistors 311 and 312 is sufficiently negative to drive the direct current amplifier tube 316 to cutoff when there is zero or slightly negative voltage on the grid of the tube 310 from the discriminator 28. This means that so long as the discriminator output voltage is zero or slightly negative, there is no current flow through the winding 320 of the right pen motor 36. This condition coincides with maximum frequency of the signal from the right line oscillator 10. However, when this right line signal frequency is decreased down to and beyond the center frequency of 1700 cycles, the output voltage from the discriminator becomes increasingly positive. This is reflected by a continual shift in the bias of the direct current amplifier 316 in a direction to increase the current flow through the amplifier and through the control winding 320 of the pen motor 36.

The amplifier 316, therefore, effectively transforms the voltage output from the discriminator 28 into an amplified direct current through the control winding 320 of the right pen motor 36 driving the pen 37 of FIGURE 2. In a similar manner, the cathode follower 350 controls the direct current amplifier tube 358. Therefore, as the frequency of the left line signal from the left line oscillator 12 decreases from a maximum through its center frequency to a minimum, the current flow through the amplifier tube 358, and, therefore, through the control winding 362 of the left pen motor 38 increases, from a minimum to a maximum. This tube 358, as previously noted, functions as a direct current amplifier, and it transforms the output voltage from the discriminator 30 into an amplified direct current through the control winding 362 of the left pen motor. Also, the amplifier tube 358 is controlled by the cathode follower 350 to pass zero current through the control winding when there is zero output voltage from the discriminator 30.

The discriminators 28 and 30 are, therefore, effectively operated through their "zero voltage" points for wide-range linear operation. However, the control circuit of the tubes 412 and 424 causes the discriminator output voltages to increase positively from zero as the frequencies of the left line and right line signals are shifted. Also, this control circuit permits the discriminator output voltages to drop to zero when the signals are absent so as to prevent sudden jerks of the receiver pen as is fully described in the copending application.

It is apparent that when either of the signals from the oscillators 10 and 12 at the transmitter are interrupted, the bias voltage produced by the control system of the tubes 412 and 424 must rapidly disappear. If this were not so, a spurious positive voltage would be produced by the discriminator upon the discontinuance of these signals. This spurious voltage would produce unwanted jerks in the control of the receiver pen 37. Rapid removal of the biased voltage from the control system is effected by the action of the capacitor 428. In the absence of the frequency-signals, when the tube 412 is conductive, this capacitor is normally discharged. Now, received interference signals, such as noise, spikes and the like, which could produce intermittent discontinuities in the conduction of the tube 424, have little effect on the succeeding portions of the system. This is because such spikes are absorbed by the capacitor 428. Before these interference signals have any noticeable effect on the system, they must be sustained long enough to enable the capacitor 428 to receive its charge. This charge is obtained through the resistor 422. The resistor 422 has a relatively large value so that the charge time for the capacitor 428 is relatively long. However, after the signals from the transmitting station have been received, the tube 412 is rendered nonconductive (as previously described), and the capacitor 428 gradually becomes fully charged.

Then, when the signals from the transmitter are interrupted, the tube 412 immediately becomes conductive, and the capacitor 428 rapidly discharges through the tube. This means that the cathode follower 424 is rapidly returned to its state of minimum conduction when the signals from the transmitter are discontinued. This effectively removes the bias voltages from across the potentiometers 430 and 432. Therefore, the output voltages from the discriminators 28 and 30 are returned essentially to zero so that there is zero current through the control windings 320 and 362 of the pen motors 36 and 38 in the absence of signals from the transmitting station.

The pen lifter solenoid 42 may be disposed in an inclined plane as best seen in FIGURES 5 and 6, and it may include a pair of parallel windings 600 as best seen in FIGURE 7. The solenoid also includes a pair of armatures 601. The armatures 601 coact with a pair of arms 602, these arms being pivotally mounted to a mounting bracket 604 on a pivot pin 605. Movement of the armatures 602 in and out of the windings 600 causes the arms 602 to pivot about the pin 605.

An essentially vertical rectangular support member 606 is carried by the arms 602, and the support member embraces the recording medium 39. The member 606 engages the underside of the pen linkage 384 and 386, and it serves to lift the pen 37 up from the surface of the recording medium 39 whenever the windings 600 are energized.

The construction of the solenoid 42, the armatures 601, the arms 602, the bracket 604 and the support member 606 may be similar to corresponding members described in detail in the Lauder et al. Patent 2,355,087.

Whenever the windings 600 of the solenoid are energized, the armatures 601 move with respect to the windings from the position shown in FIGURE 5 to the position shown in FIGURE 6. This causes the arms 600 to pivot about the pivot pin 605 and move the rectangular support member 607 upwardly with respect to the surface of the recording medium 39. Such upward movement of the support member 606 causes it to engage the linkage members 384 and 386 and lift the pen 37 up from the recording medium, as shown in FIGURE 6.

Therefore, each time the solenoid 42 is energized, it functions to lift the pen 37 up from the surface of the recording medium. As previously noted, this lifting of the pen 37 occurs whenever the transmitter stylus 18 of FIGURE 1 is raised up from its platen 20. Therefore, the receiver pen transcribes on its recording medium only when the transmitter stylus is actually pressed down to a transcribing position on its platen.

The signal from the filter 24, as previously mentioned, is amplified in the amplifier formed by the tubes 400 and 402. This signal is then detected by the circuit of the cathode follower tube 406. The tube 406 is appropriately biased so that it functions as a rectifier and a rectified voltage appears across its cathode resistor 408 whenever the stylus 18 at the transmitter is lifted to close the switch 116, or whenever the push button switches **70*a* and 70*b* of FIGURE 2 are actuated. This detected voltage is filtered by the capacitor 410 and is amplified by the direct current amplifier 409**. The amplified voltage is introduced to the movable arm of the switch 411.

Whenever the transmitted left and right line signals are received by the receiver, current flows through the motor winding 362. This current flow causes the switch 423 to close. The closure of the switch 423 completes the energizing circuit to the winding 419 of the control relay to close the arm of the switch 411 on it slower contact. This condition of the switch 411 connects the anode of the tube 409 to the lower terminal of the winding 415 of the pen lifted solenoid 42. The solenoid 42, therefore, is energized during the transcribing operation and it lifts the pen 37 up from its recording medium 39 whenever the stylus 18 at the transmitter is lifted.

At the completion of the message and when the unison relay switch 60 has been actuated at the transmitter, the signal from the oscillator 14 is held by the unison relay switch 78 (FIGURE 2) at an appropriate frequency for selection by the receiver regardless of the position of the under-platen switch 15 (FIGURE 1) at the transmitter. When the message is terminated, the energizing switch 423 of the control relay is opened so that the switch 411 of this relay contacts the terminal of the buzzer 413.

Therefore, when the signal switch 70*a*, 70*b* (FIGURE 2) is actuated, the resulting signal actuates the buzzer 413. As noted previously, all receivers, except one receiving the message, are clamped by their clamp relays and remained clamped after the message. Only the receiver which received the message remains unclamped for a predetermined interval after the message. Therefore, only the latter receiver does not have a ground on the terminal 185 which would otherwise mute the amplifier 402 and would not permit actuation of the buzzer.

Also, only the receiver actually conditioned to receive the signals, that is, the called receiver, has ground instead of C— on its terminal 183. Therefore, only the conditioned receiver has an appropriate bias on the amplifiers 310 and 350 to permit these amplifiers to translate the received left and right line signals. All other receivers are effectively clamped by their relays.

To prevent jerking of the receiver pens, the unison switch 60 of FIGURE 2 is so positioned that, to actuate it, the stylus 18 at the transmitter must be moved to a position away from its platen such that both the discriminators 28 and 30, in their biased condition by the control circuits of the tubes 412 and 424, are developing zero output voltages. Also, the direct current amplifier tubes 316 and 318 are in this condition passing zero current through the pen motor windings.

Also, when the transmitted left and right line signals are interrupted, the discriminator bias control voltages immediately disappear in the described manner. Therefore, the discriminators continue to develop zero voltage. As previously noted, this condition prevents the receiver pens from being jerked to another position upon the termination of the signals from the transmitter, or upon the receiver being turned off.

The present invention provides, therefore, an improved telescribing system which incorporates selective calling features. The system is so constructed and arranged that a common transmission medium may be used between the various stations in the network. Suitable interlock controls are incorporated to prevent interference and to provide that one transmitter only at a time can utilize the transmission medium. Moreover, all the necessary controls are incorporated without the need for any additional links between the transmitters and the remote receivers.

We claim:

1. A dial system for selectively directing a pair of information signals from a sending station to any one of a plurality of distant receiving stations, said dial system comprising, at the sending station, an output amplifier, first relay means for obtaining the introduction of only one of said signals to said amplifier in a first operating condition of said first relay means and for obtaining the introduction of both of said signals to said amplifier in a second operating condition of said first relay, second relay means for introducing the signals from said amplifier to a medium for transmission to a plurality of distant stations, an actuatable dialing mechanism having first and second sets of contacts, means including the first set of contacts in the dialing mechanism for completing an energizing circuit for said second relay means upon the actuation of said dialing mechanism, means including the second set of contacts in said dialing mechanism for producing, upon an energizing of said second relay during the actuation of the dialing mechanism, an interruption in the introduction of said one of said signals to the medium to control the selection of a particular one of the distant stations for the reception of the signals in accordance with a particular code for each station, and means responsive to the energized state of the second relay for obtaining the second state of operation in the first relay means upon the selection of the particular distant station.

2. The system defined in claim 1 in which a time constant circuit is included in said energizing circuit for said second relay means to maintain said second relay means energized for only a particular interval during the operation of said first relay means in said first state.

3. The system defined in claim 1 which includes means for maintaining said second relay means energized during the operation of said first relay means in its second operating state.

4. The system defined in claim 1 in which includes means for effectively disconnecting said dialing mechanism from said energizing circuit for said second relay means upon a selection of one of the distant stations for the reception of the signals.

5. Apparatus for sending messages in the form of information signals from a calling station to a selected one of a plurality of distant receiving stations, including, means for producing at the calling station a plurality of signals coded to select a particular one of the receiving stations and for sending the signals to the distant stations, means for decoding the signals at the distant stations to select for activation the particular distant station in accordance with the code provided for the signal, means including a time delay circuit at the distant station responsive to the decoding means for automatically de-activating the distant station a delayed time after the activation of the distant station to render the system in condition for the selection of a new distant station, means including an actuatable member for rendering the de-activating means ineffective upon the actuation of the member within the delay time of the time delay circuit, and means for providing for the transmission of the information signals to the particular distant station upon the actuation of the actuatable member within the particular time after the activation of the particular distant station.

6. Apparatus for sending messages in the form of information signals from a calling station to a selected one of a plurality of distant receiving stations, including, means including electrical circuitry for producing at the calling station a plurality of signals coded to select a particular one of the receiving stations and for sending the signals to the distant stations, means including electrical circuitry for decoding the signals at the distant stations to select for activation the particular distant station in accordance with the code provided for the signals, means including electrical time delay circuitry at the distant station responsive to the decoding means for automatically de-activating the distant station a delayed time after the activation of the distant station so as to render the system in condition for the selection of a new distant station, electrical circuitry including an actuatable member for rendering the de-activating means ineffective upon the actuation of the member within the delay time of the time delay circuitry, means including electrical circuitry for providing for the transmission of the information signals to the particular distant station upon the actuation of the actuatable member within the particular time after the activation of the particular distant station, electrical circuitry including the actuatable member for rendering the time constant means effective upon the actuation of the member at the completion of a message, means including electrical circuitry coupled electrically to the actuatable member and the time constant means for de-activating the particular distant receiving station upon a failure to actuate the actuatable member within the particular time after the actuation of the member at the completion of a message, and means including electrical circuitry coupled electrically to the actuatable member and the activating means at the particular distant station for maintaining the particular distant station activated for receiving a new message upon the actuation of the actuatable member within the particular time after the actuation of the member at the completion of a message.

7. A dial system for connecting an information signal produced at one calling station simultaneously to a local receiving station and selected ones of a plurality of remote receiving stations over a common transmission line, said system comprising, means for producing at the calling station a plurality of signals, means for coding at least one of the signals to represent a particular one of the receiving stations, means for sending the signals to the receiving stations, means at the receiving stations for detecting the coded signals sent from the calling station, means at the receiving stations for decoding the detected signal to obtain an energizing of only the particular receiving station for the reception of the information signals from the calling station, means including an actuatable member at the calling station for obtaining a sending of the information signals from the calling station to the particular receiving station upon the actuation of the member and after the energizing of the particular receiving station for the reception of the information signals, and means including the actuatable member at the calling station for energizing the local receiving station upon the actuation of the member and after the energizing of the particular receiving station.

8. A system for directing information signals from information signal generating means at a calling station to a selected one of a plurality of receiving stations over a single transmission line, including, dial-actuated means for completing a circuit between the transmission line and the information signal means, the dial actuated means periodically interrupting said circuit in accordance with its actuation a selected number of times and in accordance with the particular one of the receiving stations to be selected, electrical circuitry including relay means at the receiving stations connected to the transmission line for detecting the information signals from the dial-actuated means at the calling station, decoding means electrically coupled to the detecting means at the receiving stations for selecting a particular one of the receiving stations in accordance with the pattern of the detected signals, electrical circuitry including relay means coupled electrically to the decoding means at the receiving stations for energizing the particular receiving station to receive information signals from the calling station, means including electrical circuitry in a local receiving station positioned at the calling transmitter for coupling the calling station to the local receiving station upon the selection of a particular receiving station to obtain an introduction of the information signals from the calling station to the local receiving station, and means including electrical circuitry at the calling station for coupling the calling station to the particular receiving station upon the selection of the particular receiving station to obtain the transmission of information signals from the calling station to the particular receiving station.

9. A system for directing information signals from information signal generating means at a calling station to a selective one of a plurality of receiving stations, including, dial-actuated means for producing signals in accordance with its actuation and in representation of the particular one of the receiving stations to be actuated, means at the receiving stations for detecting the signals from the dial-actuated means to produce signals in accordance with such detection, means at the receiving stations responsive to the detected signals for selecting a particular one of the receiving stations for the reception of signals from the calling station in accordance with the pattern of the detected signals, an actuatable member at the calling station, means controlled by the actuatable member for providing a release of the selected distant station after a particular period of time from the selection of the station upon a failure to actuate the member within such time, and means controlled by the actuatable member for obtaining a transmission of the information signals from the calling station to the selected distant station upon the actuation of the member within the particular period of time.

10. A system for directing information signals from information signal generating means at a calling station to a selected one of a plurality of receiving stations, including, means including dial-actuated means and relay means for producing signals in accordance with the actuation of the dial-actuated means and in a code dependent upon the particular one of the receiving stations to be selected and for energizing the relay means to indicate the initiation of a dialing operation, means at the calling station for deenergizing the relay means at the calling station a particular time after the initiation of a dialing operation upon a failure to continue the dialing operation within the particular time, means at the receiving stations for detecting the signals from the dial-actuated means at the calling station during the energizing of the relay means, decoding means at the receiving stations for selecting a particular one of the receiving stations in accordance with the pattern of the detected signals, means operative at the particular receiving station upon the selection of such station to prepare such station for the reception from the calling station of information signals , an actuatable member, and means including the actuatable member for providing for the sending of the information signals to the particular distant station upon the actuation of the member after the selection of the distant station and during the energizing of the relay means at the calling station.

11. An automatic switching system by which any one of a plurality of identical communication stations, each including information signal generating means for sending messages and signal responsive means for reproducing the messages, can transmit information to any other of the stations over a common transmission line, comprising at each station an interlock relay, means for energizing the interlock relay when it is desired to transmit information, means responsive to energizing of the interlock relay for connecting the information signal generating means to the transmission line, a detector relay coupled to the transmission line and actuated by the presence of an information signal on the line, coding means for interrupting the information signal a selected number of times to actuate the detector relay a desired number of times, means including a clamping relay for coupling the signal responsive means to the transmission line when the clamping relay is energized, decoding means for actuating the clamping relay after a predetermined number of input voltage pulsations, means controlled by the interlock relay for pulsing the decoder in response to actuation of the detector relay only when the interlock relay is not energized, and means responsive to the detector relay and the interlock relay for disabling said means for connecting the information signal generating means to the transmission line when the detector relay is energized and the interlock relay is not energized, whereby only one station at a time can put an information signal on the line.

12. An automatic switching system by which any one of a plurality of identical communication stations, each including information signal generating means and signal responsive means, can transmit information to any other of the stations over a common transmission line, comprising at each station an interlock relay, means for energizing the interlock relay when it is desired to transmit information, means responsive to energizing of the interlock relay for connecting the information signal generating means to the transmission line, a detector relay coupled to the transmission line and actuated by the presence of an information signal on the line, coding means for interrupting the information signal a selected number of times to actuate the detector relay a desired number of times, means including a clamping relay for coupling the signal responsive means to the transmission line when the clamping relay is energized, decoding means for actuating the clamping relay after a predetermined number of input voltage pulsations, means for pulsing the decoder in response to actuation of the detector relay, and means responsive to the detector relay and the interlock relay for disabling said means for connecting the information signal generating means to the transmission line when the detector relay is energized and the interlock relay is not energized, whereby only one station at a time can put an information signal on the line.

References Cited in the file of this patent

UNITED STATES PATENTS

| | | |
|---|---|---|
| 2,222,131 | Willis | Nov. 19, 1940 |
| 2,274,638 | Rosene | Mar. 3, 1942 |
| 2,371,311 | Potts | Mar. 13, 1945 |
| 2,462,904 | Rosen | Mar. 1, 1949 |
| 2,475,675 | Peterson | July 12, 1949 |
| 2,523,914 | Molnar | Sept. 26, 1950 |
| 2,583,720 | Adler | Jan. 29, 1952 |
| 2,621,249 | Ress | Dec. 9, 1952 |
| 2,735,884 | Blanton et al. | Feb. 21, 1956 |
| 2,805,283 | Stiles | Sept. 3, 1957 |